United States Patent

[11] 3,589,379

| [72] | Inventors | James J. Daues<br>St. Louis;<br>David P. Hargraves, Webster Groves, both of, Mo. |
|---|---|---|
| [21] | Appl. No. | 799,650 |
| [22] | Filed | Feb. 17, 1969 |
| [45] | Patented | June 29, 1971 |
| [73] | Assignee | McDonnell Douglas Corporation<br>St. Louis, Mo. |

[54] INLET DUCT
20 Claims, 10 Drawing Figs.

[52] U.S. Cl.................................................. 137/15.1
[51] Int. Cl..................................................... F02b 27/02
[50] Field of Search........................................... 138/45;
137/15.1, 15.2; 244/15

[56] References Cited
UNITED STATES PATENTS

| 2,944,764 | 7/1960 | Lane | 244/15 |
| 2,971,331 | 2/1961 | Silverman | 137/15.1 |
| 2,997,843 | 8/1961 | Arnett | 137/15.2 |
| 3,054,255 | 9/1962 | Stratford | 137/15.1 |
| 3,104,522 | 9/1963 | Pennington | 138/45 |
| 3,163,981 | 1/1905 | Goodall | 137/15.2 |
| 3,417,767 | 12/1968 | Young | 137/15.2 |

*Primary Examiner*—Alan Cohan
*Attorney*—Gravely, Lieder & Woodruff

ABSTRACT: A jet engine inlet duct resembling a duct of the internal compression variety, but having a vent opening in one of its sidewalls for allowing spillage of a sufficient amount of air to permit the establishment of a shock wave system in the duct as the aircraft accelerates to supersonic speeds. The shock wave system includes a normal shock wave which passes downstream in the duct to a throat area therein, and the vent further extends across the region of the normal shock to afford spillage of a limited amount of air from the subsonic region behind the normal shock wave. The duct also includes a rocking ramp pivoted intermediate its ends about an axis transverse to the channel through the duct. The leading edge of the ramp is located forwardly of the channel while its trailing end is in the channel, and accordingly the capture area and throat area of the duct are changed as the inclination of the ramp changes. A sideplate extends downwardly from the ramp so that the inlet functions similar to an internal compression inlet.

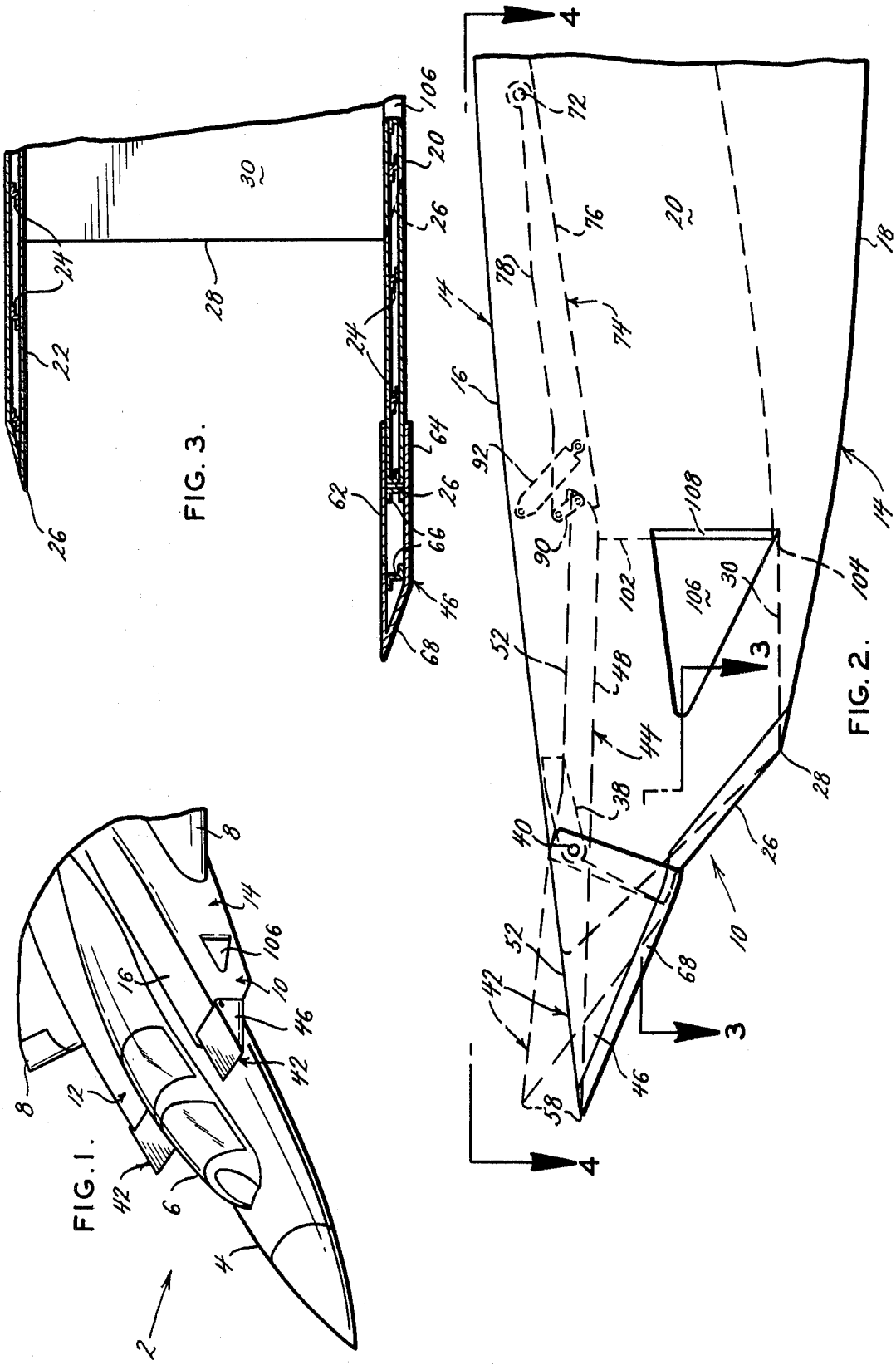

INLET DUCT

This invention relates in general to aircraft and, more particularly, to an air inlet duct for conveying air to the jet engine of an aircraft.

While turbojet engines are capable of propelling aircraft at supersonic velocities, the compressors of their engines are incapable of accepting supersonic airflow, and consequently the velocity of the air entering such engines must be reduced substantially to fall within the subsonic velocity range. The most practical way of achieving subsonic velocities at the engine compressor has been to establish one or more shock waves in the airstream to the compressor. These shock waves represent boundaries across which abrupt changes occur in the physical properties of the air as the air advances toward the engine. In particular, as the air flows downstream across a shock wave its velocity decreases appreciably while its static pressure and static temperature increase. The transition is not isentropic, but nevertheless may approach an isentropic process when the duct is properly configured, so that the pressure of the airstream beyond a shock wave is relatively high. By reducing the severity of the shock wave the transformation more nearly resembles isentropic conditions, and consequently it is desirable to employ two or more shock waves at the jet engine inlet ducts, rather than having the velocity reduced to subsonic conditions across only one shock wave.

Heretofore it has been the practice to induce the final shock wave in the shock wave system either ahead of the inlet duct or completely within the confines of the duct itself. The former is termed external compression and offers an inherently stable shock wave system which requires little, if any, downstream airflow control within the duct itself to maintain stability. It does, however, allow a significant amount of lateral flow from the high-pressure area behind each shock wave, causing the air within that portion of the stream to accelerate, and this in turn results in subsequent shock waves of greater strength and an accompanying reduced pressure at the compressor to the engine. In the latter case, that is when the shock waves are induced within the inlet duct, the shock waves are not so large in magnitude and more closely approach isentropic conditions so that higher pressures are developed at the engine compressor under similar operating conditions. Internal shock waves, however, are difficult to stabilize under variable flight conditions and indeed require a complex system of controls which operate bleed doors interspersed in the duct downstream from its throat.

Furthermore, at speeds within the supersonic range, the ratio of the capture area to the throat area of the inlet duct should increase as the aircraft speed increases to achieve the most efficient inlet operation. In addition, the air demand of the typical jet engine decreases as speed increases above sonic, and accordingly at higher velocities a smaller throat area is desirable to maintain a close airflow match between engine and inlet. Coupled with these two factors is the fact that the pressure recovery of the airflow across the shock waves is dependent on the angle the inlet ramp assumes with respect to the free stream surrounding the aircraft fuselage. To closely approach isentropic conditions across the shock waves throughout a wide range of supersonic velocities, the ramp angle should increase as the velocity increases.

One of the principal objects of the present invention is to provide a jet engine inlet duct capable of inducing shock waves which are inherently stabilized without the necessity of complex controls and components associated with the duct. Another object is to provide a duct of the type stated which is highly efficient and transmits the airflow to the engine at high pressures. A further object is to provide a duct which is low in drag throughout a wide range of supersonic velocities and can accommodate itself closely to the engine airflow needs throughout such a range. Still another object is to provide an inlet duct which is simple in construction and easy to manufacture. These and other objects and advantages will become apparent thereinafter.

The present invention is embodied in an inlet duct of a pseudo-internal compression variety which is capable of inducing a shock wave system at supersonic velocities. The duct includes vents which afford spillage of air from the duct so as to avoid choking of the airstream as the shock wave system is being established. The invention is also embodied in a pivoted ramp at the entrance to the intake channel. The ramp is pivoted such that changes in its inclination will simultaneously alter the capture and throat areas of the duct. The invention also consists in the parts and in the arrangements and combinations of parts hereinafter described and claimed.

In the accompanying drawings which form part of the specification and wherein like numerals and letters refer to like parts wherever they occur:

FIG. 1 is a fragmentary perspective view of an aircraft provided with inlet ducts constructed in accordance with and embodying the present invention;

FIG. 2 is an elevational view of an inlet duct of the present invention;

FIG. 3 is a sectional view taken along line 3–2: of FIG. 2;

Figure 4:
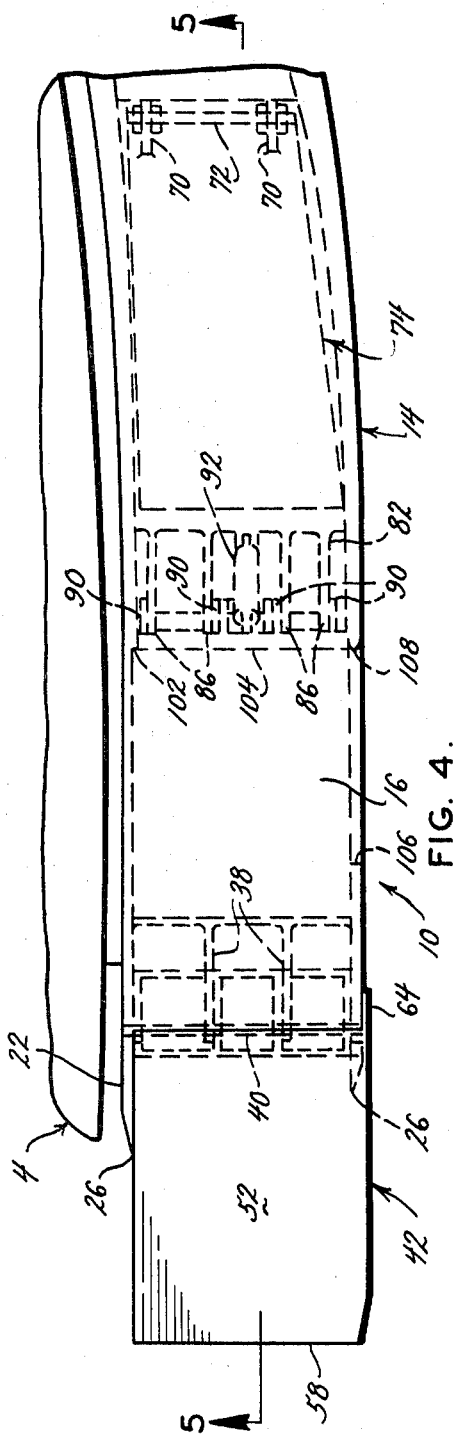
FIG. 4 is a top plan view of the inlet duct taken along line 4–4 of FIG. 2.

Referring now in detail to the drawings, 2 designates an aircraft having a fuselage 4, a cockpit 6, wings 8, and a pair of inlet ducts 10 and 12 opening forwardly on each side of cockpit 6 in front of the wings 8. Each duct 10 and 12 extends rearwardly for conveying air to the compressors of jet engines (not shown) located aft of the cockpit 6. Since the port and starboard inlet ducts 10 and 12, respectively, are identical for all practical purposes, except one is a reversal of the other, only the inlet duct 10 on the near side of the fuselage 4 (FIG. 1) will be described in detail.

Figure 5:
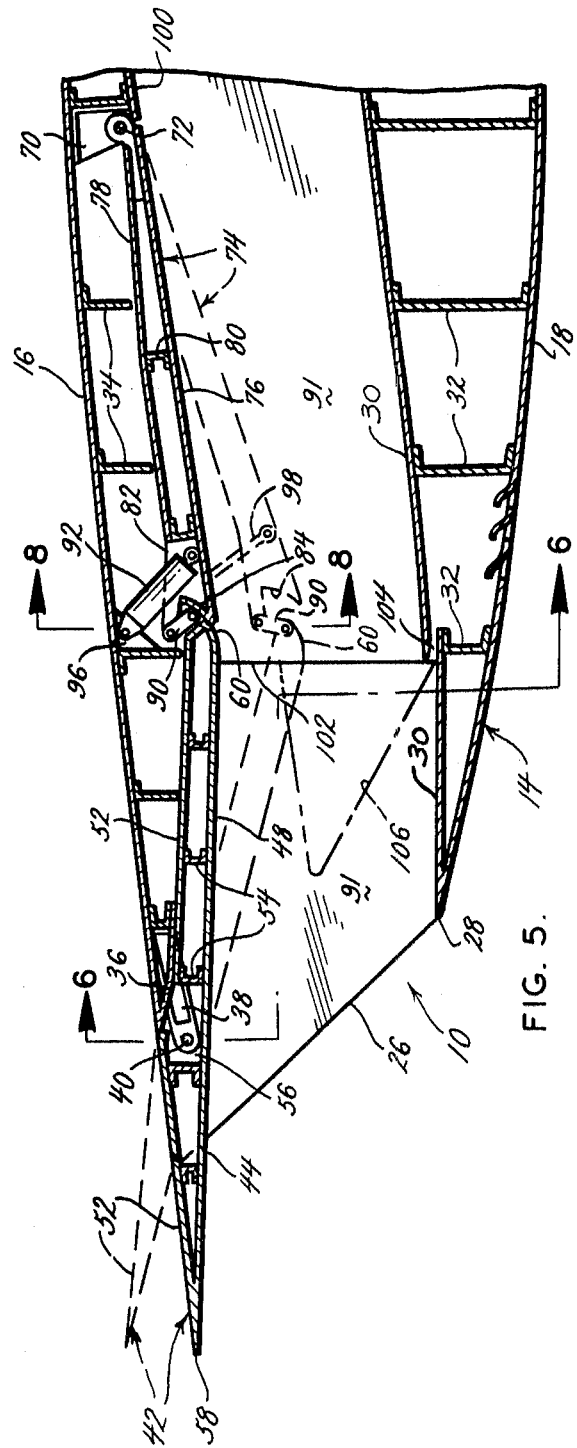
FIG. 5 is a sectional view taken along line 5–5 of FIG. 4.
Figure 6:
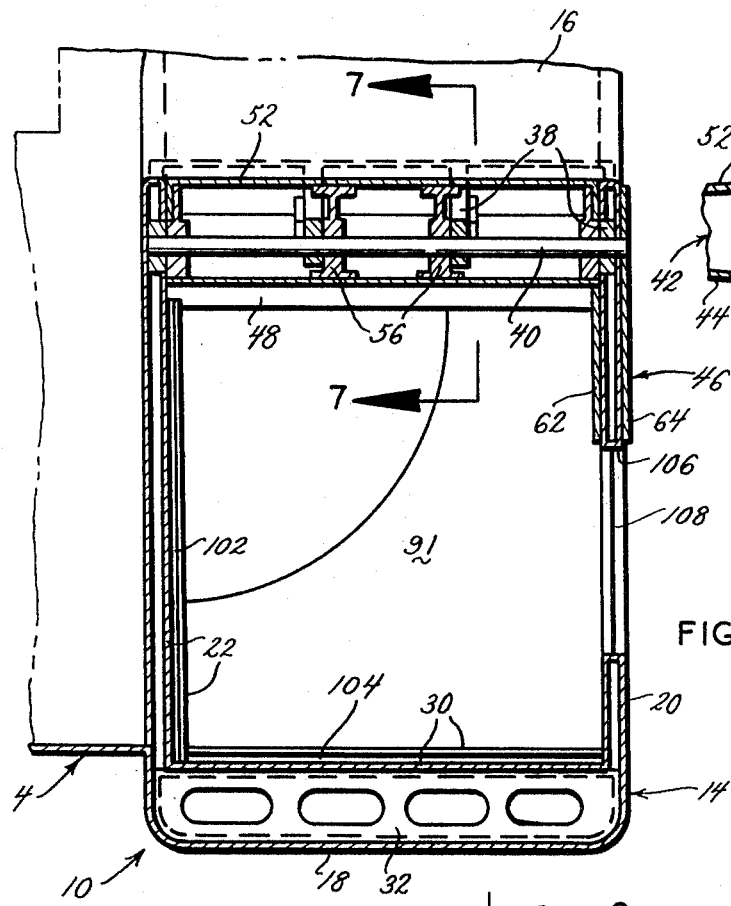
FIG. 6 is a sectional view taken along line 6–6 of FIG. 5.

The inlet duct 10 (FIGS. 2, 4, 5 and 8) includes a fairing 14 having an upper panel 16 and a lower panel 18, both of which project outwardly from the fuselage 4 and are connected at their outer ends by a generally vertical outer sidewall 20. Internally the fairing 14 is provided with an inner sidewall 22 (FIGS. 3 and 6) which is located parallel to the outer sidewall 20. Both the sidewalls 20 and 22 are of laminar construction, consisting of sheets of aluminum or some other suitable metal maintained in rigid spaced relation by ribs 24 interposed between them. The sidewalls 20 and 22 furthermore have leading edges 26 which are exposed in part to the airstream and are inclined downwardly and rearwardly away from the front margin of the upper panel 16. The leading edges 26 intersect a lower leading edge 28 formed on the duct 10 by the convergence of the lower panel 18 and a rearwardly extending lower wall or ramp 30 which is located within the confines of the fairing 14 (FIG. 5). Both the lower panel 18 and the lower ramp 30 are rigidified by a plurality of channellike cross struts 32, and similarly the upper panel 16 is also rigidified by another set of cross struts 34.

Figure 7:
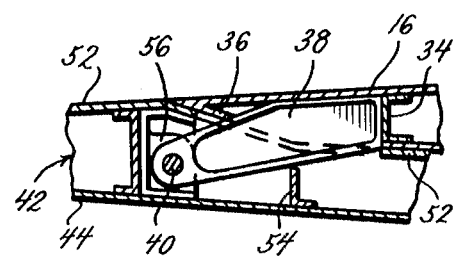
FIG. 7 is a sectional view taken along line 7–7 of FIG. 6.

The foremost cross strut 34 on the upper wall 16 has a channellike cross-sectional shape with one of its flanges being secured to the upper panel 16 and its other being connected to an underlying partition panel 36 which converges with the upper wall 16 such that the two have a common front margin. The foremost strut 34 furthermore carries a plurality of hinge brackets 38 (FIGS. 6 and 7) which project forwardly and downwardly through the partition panel 36 and terminate beneath its leading margin where they are fitted with a front cross rod 40 on which a forward rocking ramp 42 is journaled. The forward rocking ramp 42 includes an upper or compression wall 44 and an outer sideplate 46 which form forwardly extending continuations of the upper wall 16 and the outer sidewall 20, respectively, of the fairing 14. The upper wall 44 consists of a downwardly presented compression panel 48 and an overlying panel 52 which are each formed from a suitable sheet material such as aluminum and are secured to one another through a plurality of transversely extending ribs 54. One of the ribs 54 located at the approximate center of the wall 44 is provided with rearwardly projecting hinge blocks 56 through which the cross rod 40 extends. The center of the overlying panel 52 underlies the partition panel 36 on the fairing 14, while its forward end converges with the compression panel 48, joining the latter at a forwardly presented upper leading edge 58 located on the wall 44 forwardly of the lower leading edge 28. At its trailing end the compression panel 48 curves upwardly in the provision of an arcuate trailing surface 60 which merges with the overlying panel 52.

The sideplate 46 (FIG. 3 and 6) of the rocking ramp 42 is generally triangular in shape and includes inner and outer segments 62 and 64, which are also formed from a suitable sheet metal and are rigidified by ribs 66. At their trailing ends the segments 62 and 64 extend across the leading edge 26 and the side faces of the outer sidewall 20 such that the sidewall 20 is interposed between them, while at their forward edges they converge into a knifelike leading edge 68 which extends downwardly and rearwardly. The leading edge 68 of the outer sideplate 47 emanates from the upper leading edge 58 on the upper wall 44 and forms a continuation of the leading edge 26 on the outer sidewall 20. By means of this construction the forward rocking ramp 42 may be pivoted about the cross rod 40 from the full line position to the broken line position in FIG. 5, in which case the capture area of the duct 10 would be increased, owing to the greater elevation of the upper leading edge 58 on the ramp 42 relative to the fairing 14, whereas the throat area in the vicinity arcuate trailing surface 60 on the ramp 42 would be diminished.

Figure 8:
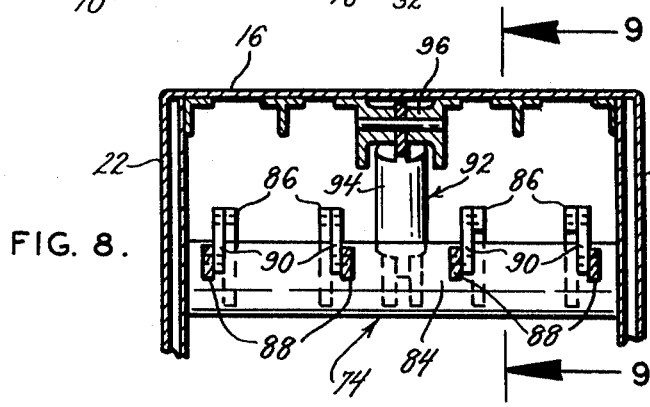
FIG. 8 is a sectional view taken along line 8–8 of FIG. 5.
Figure 9:
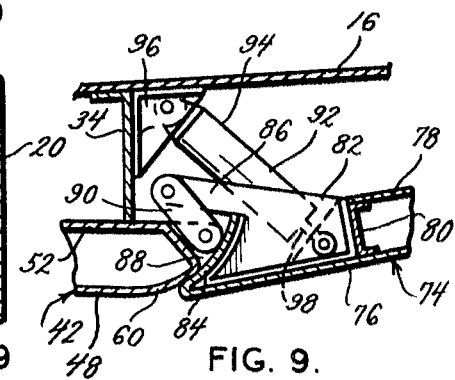
FIG. 9 is a sectional view taken along line 9–9 of FIG. 8.

One of the rearwardly disposed cross struts 34 on which the upper wall 16 is supported is also provided with hinge brackets 70 (FIG. 5) through which a rear cross rod 72 extends, and journaled on the cross rod 72 is a rear ramp 74 having a bottom panel 76 and an overlying panel 78, both of which are formed from a suitable sheet metal and are connected intermediate their ends by transverse ribs 80. At their rear ends the panels 76 and 78 are secured to a rearwardly projecting hinge block 81 through which the rear cross rod 72 extends. At its forward end the rear ramp 74 is provided with a connector block 82 (FIG. 9) over which the bottom panel 76 is curved in the provision of an arcuate leading surface 84 which conforms to the contour of the arcuate trailing surface 60 on the forward ramp 42. Moreover, the cross rod 72 and arcuate surface 84 are disposed such that when the trailing end of the forward ramp is raised to the full line position in FIG. 5 the arcuate surfaces 60 and 84 will engage one another and create a barrier to the passage of air between them. The connector block 82 integrally includes forwardly projecting arms 86 which overlie another connector block 88 on the end of the forward ramp 42, and interconnecting the arms 86 on the connector block 82 and the connector block 88 are a series of links 90 (FIGS. 8 and 9). Consequently, the ramps 42 and 72 will move in unison, and as they move from the full line position to the broken line position in FIG. 5 their arcuate surfaces 60 and 84 will spread apart creating a gap or transverse slit between the two ramps 42 and 74. Thus, the sidewalls 20 and 22, the lower ramp 30 and the combination of the compression panel 48 on the forward rocking ramp 42 and the panel 76 on the rear ramp 74 define the forward portion of an intake channel 91 within the inlet duct 10.

The ramps 42 and 72 are shifted in unison by a hydraulic cylinder 92 (FIGS. 5, 8 and 9) having a barrel 94 which is pinned to a mount 96 on one of the cross struts 34 and a piston rod 98 which is pinned to the connector block 82 at the forward end of the rear ramp 74. The cylinder 92 receives pressurized hydraulic fluid from the hydraulic system of the aircraft 2 and is preferably operated by an automatic control system (not shown) which is responsive to the velocity of the aircraft 2. It may also be constructed for manual operation from the cockpit 6. When the piston rod 96 extends it swings the forward end of the rear ramp 74 downwardly, the rear end of the ramp 74 pivoting about the axis of the rear cross rod 72. Simultaneously the rear end of the forward ramp 42 is moved downwardly decreasing the cross-sectional area of the intake channel 91. The smallest area of the channel 91 is termed the throat, and that is located at the juxtaposed trailing edge of the forward ramp 42 and the leading edge of the rear ramp 74. As the rear end of the forward ramp 42 is lowered, its front end is elevated, inasmuch as the front cross rod 40 is interposed between the two, and the elevational movement raises the upper leading edge 58 and places the compression panel 48 at a greater inclination to the free airstream, thereby increasing the capture area of the duct 10. In other words, when the inclination of the panel 42 is increased, the compression panel 48 is capable of diverting more air at a greater angle into the intake channel 91. Since the front cross rod 40 extends across the approximate midpoint of the forward ramp 42, the forces on the rear and front portions of the compression panel 48 will counteract and tend to offset one another, and consequently a large cylinder 92 is not required to change the positions of the ramps 42 and 74 or to maintain them in any selected position.

The cross struts 34 which support the upper panel 16 also carry a rigid upper ramp 100 located to the rear of the rear ramp 74. The rigid upper ramp 100 along with the sidewalls 20 and 22 and the lower ramp 30 serves to define the rear or subsonic diffuser portion of the intake channel 91 and forms a continuation of the compression panel 48 and the bottom panel 76 on the ramps 42 and 74, respectively.

The inner sidewall 22 is stepped inwardly in the formation of an elongated bleed slot 102 which extends vertically and is located at the end of the rear ramp 42, and likewise the lower ramp 30 is stepped directly beneath the juncture of the ramps 42 and 74 in the formation of a similar elongated bleed slot 104 which extends transversely of the channel 91. The slots 102 and 104 dissipate the turbulent boundary layer next to the inwardly presented surfaces of the sidewalls 22 and the lower ramp 24 by allowing it to bleed away from the channel 91 to the exterior of the aircraft 2. When the adjoining ends of ramps 42 and 74 are lowered toward the lower ramp 30, the transverse slit created between the arcuate surfaces 60 and 84 thereon will also act as a bleed aperture for the dissipation of the boundary layer against the compression panel 48. Other conventional boundary layer removal systems may also be employed.

Finally it is significant to note that the outer sidewall 20 is provided with a triangular vent aperture 106 having one of its legs presented vertically immediately preceding juncture of the forward and rear ramps 42 and 74, and the apex opposite that leg oriented forwardly and located slightly behind the lower leading edge 28 on the lower ramp 30 (FIG. 2). The inner and outer sheet metal segments of the sidewall 20 are interconnected at the vertical leg by a short beveled connecting element 108 which projects forwardly. Whereas the compression panel 48 and lower ramp 30 converge rearwardly, the upper and lower margins of the vent aperture 106 diverge. Thus, as the cross-sectional area of the intake channel 91 becomes smaller, the vertical size of the aperture 106 becomes correspondingly larger.

In operation, the forward and rear ramps 42 and 74 are maintained in the raised position, that is, with the piston rod 98 of the cylinder 92 retracted, when the aircraft 2 is operated at subsonic velocities, in which case the inlet duct 10 serves as a conventional subsonic air intake. Once the aircraft achieves supersonic velocity, three shock waves $a$, $b$, and $c$ (FIG. 10) will form in the airstream entering the duct 10, upstream from the throat of the intake channel 91. More specifically, during the transient period during which the shock waves system establishes itself, a normal shock wave $c$, which as the name implies is normal to the flow of the airstream, will form ahead of the lower leading edge 28 on the lower ramp 30 and will move downstream in the intake channel 91 to a stabilized position immediately ahead or upstream from the throat. The presence of the vent aperture 106 permits this advance of the normal shock wave c during the transitory period without any choking or other impedence. Stated differently, since the forward upper ramp 42 and lower ramp 30 converge, they would compress and choke the airflow in the channel 91 absent the bleedoff permitted by the aperture 106, and the choking effect would prevent the normal shock wave c from reaching its stabilized position in the vicinity of the throat in the channel 91.

As the normal shock wave approaches its stabilized position, oblique shock waves b and a form within the airstream, the former emanating from the lower leading edge 28 and extending upwardly and rearwardly therefrom into the intake channel 91 oblique to the flow of air through it. The shock wave a, on the other hand, emanates from the leading edge 58 of the ramp 42 and extends downwardly and rearwardly therefrom, oblique to the flow of air along the compression panel 48.

The shock waves a, b and c represent generally planar areas or boundaries where abrupt changes in the physical properties of the airstream occur. For example, if the aircraft were flying at 2.0 Mach., the velocity preceding the first shock wave a would be that of the free stream, that is 2.0 Mach. Between the first shock wave a and the second b, the velocity airstream could be 1.7 Mach., and intermediate the second shock wave b and the third c it could be reduced to 1.3 Mach. Across the third shock wave c, the velocity could be reduced still further to perhaps 0.8 Mach. While the flow across the shock waves a, b and c is not entirely isentropic, it approaches it, and therefore each velocity reduction across a shock wave a, b or c is accompanied by an increase in static pressure. The sideplate 46 on the forward ramp 42 enables the inlet 10 to function similar to an internal compression-type inlet by preventing the air behind the shock wave a, which air is at a higher pressure than the free stream, from leaking laterally in significant quantities past the side edges of the compression panel 48. This prevents the air between the shock waves a and b from reaccelerating and reduces the severity of the shock wave b. Similarly, the sidewalls 20 and 22 of the duct prevent the airflow behind the second shock b, which is at a still higher pressure, from dissipating laterally and thereby accelerating. The sidewalls 20 and 22 have the same effect on the airflow beyond the third shock wave c, and consequently high static pressures are developed within the airflow in the portion of the duct 10 located behind the throat. In other words, the sideplate 46 and sidewalls 20 and 22 create a condition which closely approaches two-dimensional shock wave generation, that is, the generation of shock waves by ramps of infinite width and of course the accompanying absence of side spillage, and this is characteristic of internal compression-type inlets.

Figure 10:
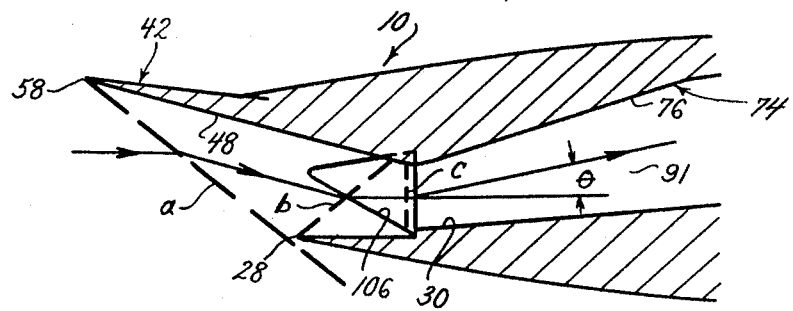
FIG. 10 is a diagrammatic view of the duct showing the shock waves induced by it and the direction of the airflow through it.

Once the series of shock waves a, b and c has been established, the triangular opening 106 allows a small quantity of the high-pressure subsonic air to-and-fro spill overboard from behind the shock wave c, and this stabilizes the shock waves a, b and c generally in the positions indicated in FIG. 10. Moreover, this spillage through the opening 106 maintains the shock waves a, b, and c stable throughout the supersonic speed range of the aircraft 2, and consequently there is no tendency for the system of shock waves to pass longitudinally to-and-fro in the intake channel 91 as is the case with conventional internal compression inlets which are not provided with complex controlling devices. Thus, the inlet duct 10 offers the high pressures associated with internal compression-type inlets, yet avoids the complex controls necessary to stabilize such shock wave systems. Indeed, its simplicity equals that of an external compression-type inlet.

Whereas the compression panel 48 on the forward ramp 42 and the lower ramp 30 converge so as to generate shock waves and to compress the airstream flowing between them, the upper and lower margins of the aperture 106 located intermediate the outer edge of those surfaces diverge in the same direction. Thus, where the cross-sectional area of the intake channel 91 is smallest, the vertical dimension of the aperture 106 is greatest. Moreover, the forward or upstream end of the aperture 106 is located slightly downstream from the leading edge 28 of the lower ramp 30, the location at which the compression panel 48 and ramp 30 effect a compression of the airstream by reason of their convergence. This disposition of the aperture 106 enables it to serve as a relief port through which a limited quantity of the air compressed between the ramps 42 and 30 may escape and thereby prevent chocking of the intake channel 91 during establishment of the shock waves a, b, and c. It will be recalled that this is the transient period when the shock wave c is advancing downstream in the intake channel 91 to its stabilized position in the vicinity of the throat. This spillage of a small quantity of air causes some pressure loss at the engine, but the pressure loss is minimal in comparison to external compression-type ducts. Furthermore, the limited spillage through the aperture 106 permits establishment of the shock wave system, and particularly the normal shock wave c at the throat in the intake channel 91, without a complex system of controls which is characteristic of internal compression-type inlet ducts. In other words, the intake duct 10 affords substantially all the advantages associated with both the internal and external compression type inlets.

Since the forward ramp 42 pivots on the front cross rod 40 which is located approximately midway between its ends, the ratio of the capture area to the throat area can be altered merely by changing the inclination of the forward ramp 42. This is achieved as was previously noted by operation of the hydraulic cylinder 92. Inasmuch as the rear ramp 74 is linked to the forward ramp 42 through the links 90, it follows the forward ramp 42, and its bottom panel 76 will always align with the compression panel 48 of forward ramp 42, thereby eliminating any discontinuity behind the forward ramp 42. As the velocity within the supersonic range increases, it is desirable to increase the ratio between the capture area and the throat area to achieve more efficient operation. Similarly, typical jet engines require less air at higher velocities in the supersonic range. Also, to achieve optimum total pressure recovery behind the oblique shock waves a and b at high speeds, it is desirable to have the compression panel 48 disposed at a relatively high angle to the free stream. Accordingly, at high speeds the piston rod 98 of the cylinder should be extended, so as to decrease the throat area of the inlet duct 10 and also increase the ratio between its capture area and throat area. At lower speeds in the supersonic range the ramps 42 and 74 may be raised to an intermediate position until optimum operating conditions are achieved. Since the ramps 42 and 74 are separated slightly when inclined, the slit between them may be used to bleed off the turbulent boundary layer generated against the compression panel 48.

To provide finer control of the capture area as well as the deflection of the flow as it passes into the channel 91 across the leading edge 28, the lower ramp 30 could also be hinged to the fairing 14 in close proximity to the throat.

It should also be noted as will be seen by reference to FIG. 10, that the flow is turned in alternate directions supersonically and consequently only a small correction in direction is required in the subsonic diffuser portion of the channel 91 for directing the flow to the engine. More specifically, the free stream is initially deflected at the shock wave a emanating from the leading edge 58 on the ramp 42 and that edge turns the flow parallel to the compression panel 48 thereon. At the shock wave b, the flow is turned back again toward the direction of the free stream so that the change in direction or angle of deflection within the subsonic region of the channel 91 is minimal.

This invention is intended to cover all changes and modifications of the example of the invention herein chosen for purposes of the disclosure which do not constitute departure from the spirit and scope of the invention.

What we claim is:

1. An inlet duct for a supersonic aircraft; said duct comprising walls defining an intake channel, the walls being arranged such that the cross-sectional area at the inlet to the intake channel is greater than the cross-sectional area of a downstream throat portion in the channel whereby the air introduced into the channel is compressed as it flows toward the throat, the walls being further arranged to induce at least one shock wave when the velocity of the airstream ahead of the inlet is supersonic, the shock wave being normally disposed within the channel and forming a transition from supersonic to subsonic flow therein, and a vent aperture in at least one of the walls for permitting the spillage of a sufficient amount of air from the portion of the intake channel located behind the shock wave to avoid chocking the airstream in the channel as the airstream ahead of the channel passes from a subsonic to a supersonic velocity so that the shock wave may move downstream through the channel to a stabilized position in the vicinity of the throat, the vent aperture extending longitudinally in the channel across the shock wave when the shock wave is in its stabilized position so that a portion of the aperture is disposed ahead of the shock wave and another portion is disposed behind the shock wave, whereby air spills out of the channel from the subsonic region thereof and the shock wave remains stabilized in the throat, the width of the vent aperture increasing as the cross-sectional area of the channel decreases.

2. An inlet duct according to claim 1 wherein the aperture is generally triangular in shape.

3. An inlet duct for the jet engine of an aircraft; said inlet duct comprising fixed walls partially defining an inlet channel; a first ramp shiftable relative to the fixed walls and also defining a portion of the inlet channel; the inlet channel having a throat, the cross-sectional area of which varies as the first ramp shifts; a second ramp located forwardly of the first ramp and extending from the intake channel, the second ramp pivoting relative to the fixed walls about an axis extending transversely of the channel and having a leading edge located forwardly from the pivot axis so that the capture area of the duct varies as the second ramp pivots, the second ramp upon encountering supersonic airstreams inducing a shock wave which forms a transition from a region of high velocity and low pressure to a region of lower velocity and higher pressure; and a sideplate mounted on the second ramp and aligning with and leading up to at least one of the fixed walls, the sideplate extending along the region of lower velocity and higher pressure for retarding the leakage of air from that region before the air enters the portion of the channel defined in part by the fixed walls.

4. An inlet duct according to claim 3 wherein the second ramp has a compression surface which forwardly terminates at the leading edge of the ramp and diverts the airstream.

5. An inlet duct according to claim 4 wherein the compression surface is located on the same side of the channel as the first ramp; and wherein the sideplate is presented substantially perpendicular to the compression surface.

6. An inlet duct according to claim 5 wherein the channel at its entrance and at the first ramp is generally rectangular; and wherein one of the fixed walls forms a third ramp having a leading edge set rearwardly from the leading edge of the second ramp but ahead of the first ramp, the leading edge of the third ramp inducing another shock wave across which another reduction in air velocity and increase in pressure occurs.

7. An inlet duct according to claim 6 wherein the shock waves induced by the leading edges of the second and third ramps are oblique to the direction of airflow along the ramps; and wherein still another shock wave is induced in the channel in the vicinity of the throat, the throat shock wave being substantially normal to the flow of air through the channel and forming a transition from supersonic to subsonic air velocities in the channel.

8. An inlet duct according to claim 4 wherein the channel at its entrance and at the first ramp is generally rectangular; wherein one of the fixed walls forms a third ramp located on the opposite side of the channel from the first and second ramps and having a leading edge set rearwardly from the leading edge on the second ramp but ahead of the first ramp; and wherein the axis about which the second ramp pivots is located intermediate the ends of the compression surface and the rear end of the compression surface is located opposite to the third ramp at the throat of the channel, whereby both the throat area and capture area of the duct are altered as the second ramp pivots.

9. An inlet duct according to claim 8 wherein the first ramp is pivoted about an axis extending transversely of the channel and set rearwardly from the throat area; wherein the first ramp generally aligns with the second ramp and forms an aft continuation thereof; and wherein connecting means connect the first and second ramps in the vicinity of the throat area for enabling the first and second ramp to move in unison and remain generally in alignment.

10. An inlet duct according to claim 6 wherein the fixed walls include upstanding sidewalls between the sides of the first ramp and the third ramp.

11. An inlet duct according to claim 10 and further characterized by a vent in at least one of the sidewalls for allowing air to spill out of the channel from the subsonic region behind the normal shock wave, whereby the shock waves are stabilized in the channel.

12. An inlet duct according to claim 11 wherein the vent is an opening in one of the walls extending longitudinally therein such that a portion of the opening is disposed downstream from the normal shock wave and another portion is disposed upstream ahead of the normal shock wave, whereby the flow within the channel will not be choked during the transient period when the shock waves are being established, enabling the shock waves to move to their stabilized positions.

13. An inlet duct for the jet engine of an aircraft; said inlet duct comprising opposed and generally parallel fixed walls partially defining an inlet channel, a ramp extending forwardly from the intake channel and pivoted relative to the fixed walls about an axis extending generally perpendicular to those fixed walls, the ramp having a leading edge located forwardly from the pivot axis so that the capture area of the duct varies as the ramp pivots, the ramp upon encountering supersonic airstreams inducing a shock wave which forms a transition from a region of relatively high velocity and low pressure to a region of lower velocity and higher pressure, and a sideplate mounted rigidly on the ramp and aligning with one of the fixed walls so as to form a forward continuation of that wall along the region of lower velocity and higher pressure, whereby the leakage of air from that region is retarded.

14. An inlet duct according claim 13 wherein a fixed ramp connects the opposed and parallel fixed walls and is located on the opposite side of the channel from the pivoted ramp, the fixed ramp having a leading edge located rearwardly from the leading edge of the pivoted ramp.

15. An inlet duct according to claim 14 wherein the shock wave induced by the pivoted ramp emanates from the leading edge of that ramp and is located oblique to the airstream flowing along the pivoted ramp; and wherein the fixed ramp also induces a shock wave which emanates from the leading edges thereof and extends into the intake channel oblique to the airstream flowing along that ramp.

16. An inlet duct according to claim 14 and further comprising another ramp located rearwardly from the pivoted ramp and being pivoted relative to the opposed and parallel fixed walls about an axis located generally perpendicular to those fixed walls; and connecting means interconnecting the forward and rear pivoted ramps to enable those ramps to pivot in unison with the leading edge of the forward ramp in general alignment with the leading edge of the rear ramp.

17. An inlet duct according to claim 13 wherein the opposed and parallel fixed walls are generally vertical and one is positioned adjacent to the fuselage of the aircraft; wherein the sideplate on the pivoted ramp aligns with the fixed inlet wall located furthest from the fuselage; and wherein the side of the pivoted ramp located opposite to the side to which the sideplate is attached is located adjacent to the fuselage.

18. An inlet duct for a jet engine of a supersonic aircraft; said inlet duct comprising opposed and generally parallel fixed walls, opposed ramps extending between the fixed walls generally perpendicular thereto and together with the fixed walls defining an intake channel, the ramps having longitudinally offset leading edges and generally converging from those leading edges to a throat area in the intake channel so that the cross-sectional area of the channel is greater at its inlet than at its throat, the ramps being arranged to induce a shock wave in the airstream entering the channel as the airstream ahead of the channel passes from subsonic to supersonic velocities, the shock wave forming a transition from supersonic to subsonic velocities and advancing downstream in the channel to a stabilized position in the vicinity of the throat, a bleed an opening in at least one of the ramps for bleeding off the boundary layer along that ramp, and a continuously open vent aperture of constant area in at least one of the fixed walls and extending longitudinally therein, the vent aperture commencing slightly rearwardly of the rearmost leading ramp edge and terminating behind the shock wave when the shock wave is in its stabilized position, the vent aperture further being sized to permit the spillage of a sufficient amount of air from the portion of the intake channel behind the shock wave as the shock wave advances toward the throat contemporaneous with the airstream ahead of the duct passing from subsonic to supersonic velocities, whereby the shock wave will move through the channel to its stabilized position and when the shock wave reaches the stabilized position air will spill from the subsonic region behind it and stabilize it in the vicinity of the throat.

19. An inlet duct according to claim 18 wherein the shock wave at the throat stands generally normal to the flow of the airstream at the throat, and wherein at least one other shock wave is induced by the ramps, the other shock wave being oblique to the flow of the airstream.

20. An inlet duct according to claim 18 wherein the vent aperture is continuous from its forward to its rear ends.